US007867927B2

(12) United States Patent
Bush et al.

(10) Patent No.: US 7,867,927 B2
(45) Date of Patent: Jan. 11, 2011

(54) METHOD AND COMPOSITION FOR COATING MAT AND ARTICLES PRODUCED THEREWITH

(75) Inventors: Philip Bush, Laurel, MS (US); Robert H. Blanpied, Meridian, MS (US); Freddie Lee Murphy, Meridian, MS (US); Jimmy Rogers Dubose, Lisman, AL (US)

(73) Assignee: Atlas Roofing Corp., Meridian, MS (US)

( * ) Notice: Subject to any disclaimer, the term of this patent is extended or adjusted under 35 U.S.C. 154(b) by 258 days.

(21) Appl. No.: 11/508,338

(22) Filed: Aug. 23, 2006

(65) Prior Publication Data

US 2007/0042657 A1   Feb. 22, 2007

Related U.S. Application Data

(63) Continuation of application No. 10/324,109, filed on Dec. 20, 2002, now Pat. No. 7,138,346.

(60) Provisional application No. 60/341,277, filed on Dec. 20, 2001.

(51) Int. Cl.
*B32B 3/00* (2006.01)
*B32B 17/02* (2006.01)
*A61F 13/15* (2006.01)

(52) U.S. Cl. ............... 442/59; 442/180; 428/219

(58) Field of Classification Search ............ 442/59, 442/86, 180; 428/341
See application file for complete search history.

(56) References Cited

U.S. PATENT DOCUMENTS 1,043,021 A    10/1912   Mayer (Continued)

FOREIGN PATENT DOCUMENTS

WO            94/26534         11/1994

(Continued)

OTHER PUBLICATIONS

International Search Report mailed Mar. 19, 2003 in corresponding PCT Application No. PCT/US02/40656.

*Primary Examiner*—Angela Ortiz
*Assistant Examiner*—Altrev C Sykes
(74) *Attorney, Agent, or Firm*—Nixon & Vanderhye P.C.

(57) ABSTRACT

A coated glass mat comprises a glass mat substrate having non-woven glass fibers and a coating which essentially uniformly penetrates the glass mat substrate to desired fractional thickness of the coated glass mat. The coating imparts a tensile strength to the coated glass mat which on average is at least 1.33 times greater than the tensile strength of the glass mat substrate without the coating. In example embodiments, penetration of the coating into the glass mat substrate preferably extends to a depth of from twenty five percent of a thickness of the coated glass mat to seventy five percent of the thickness of the coated glass mat. Moreover, a non-coated thickness of the coated glass mat is sufficiently thick for bonding purposes with, e.g., a gypsum slurry or other core materials such as thermoplastic or thermosetting plastics. The coating has a porosity in a range of from 1.3 CFM to 5.0 CFM, e.g., the coating comprises a coating blend which provides the coated glass mat with a porosity sufficient to allow water vapor to escape from a gypsum slurry when heated. The coating is preferably a coating blend comprised of water, latex binder, inorganic pigment, and inorganic binder.

7 Claims, 4 Drawing Sheets

U.S. PATENT DOCUMENTS

| | | |
|---|---|---|
| 2,273,967 A | 2/1942 | Leech |
| 3,284,980 A | 11/1966 | Dinkel |
| 3,993,822 A | 11/1976 | Knauf et al. |
| 4,119,600 A | 10/1978 | Bakule et al. |
| 4,504,533 A | 3/1985 | Altenhöfer et al. |
| 4,637,951 A | 1/1987 | Gill et al. |
| 4,647,496 A | 3/1987 | Lehnert et al. |
| 4,784,897 A | 11/1988 | Brands et al. |
| 4,810,569 A | 3/1989 | Lehnert et al. |
| 4,879,173 A * | 11/1989 | Randall ................. 442/86 |
| 5,001,005 A | 3/1991 | Blanpied |
| 5,102,728 A | 4/1992 | Gay et al. |
| 5,112,678 A | 5/1992 | Gay et al. |
| 5,148,645 A | 9/1992 | Lehnert et al. |
| 5,171,366 A | 12/1992 | Richards et al. |
| 5,220,762 A | 6/1993 | Lehnert et al. |
| 5,319,900 A | 6/1994 | Lehnert et al. |
| 5,342,566 A | 8/1994 | Schäfer et al. |
| 5,342,680 A | 8/1994 | Randall |
| 5,371,989 A | 12/1994 | Lehnert et al. |
| 5,395,685 A | 3/1995 | Seth et al. |
| 5,397,631 A | 3/1995 | Green et al. |
| 5,401,588 A | 3/1995 | Garvey et al. |
| 5,552,187 A | 9/1996 | Green et al. |
| 5,601,888 A | 2/1997 | Fowler |
| 5,644,880 A | 7/1997 | Lehnert et al. |
| 5,665,442 A | 9/1997 | Andersen et al. |
| 5,718,785 A | 2/1998 | Randall |
| 5,791,109 A | 8/1998 | Lehnert et al. |
| 5,945,182 A | 8/1999 | Fowler et al. |
| 5,945,208 A | 8/1999 | Richards et al. |
| 5,965,257 A | 10/1999 | Ahluwalia |
| 6,001,496 A | 12/1999 | O'Haver-Smith |
| 6,146,705 A | 11/2000 | Heine |
| 6,299,970 B1 | 10/2001 | Richards et al. |
| 6,360,511 B1 | 3/2002 | Brzozowski et al. |
| 6,368,991 B1 | 4/2002 | Horner et al. |
| 6,455,615 B2 | 9/2002 | Yu |
| 7,138,346 B2 | 11/2006 | Bush |
| 7,645,490 B2 | 1/2010 | Bush |
| 2002/0155282 A1 * | 10/2002 | Randall et al. ............... 428/341 |
| 2010/0087114 A1 | 4/2010 | Bush |

FOREIGN PATENT DOCUMENTS

WO             03/54319       7/2003

* cited by examiner

METHOD AND COMPOSITION FOR COATING MAT AND ARTICLES PRODUCED THEREWITH

This application is a continuation of U.S. patent application Ser. No. 10/324,109 filed Dec. 20, 2002, entitled "METHOD AND COMPOSITION FOR COATING MAT AND ARTICLES PRODUCED THEREWITH", which issued as U.S. Pat. No. 7,138,346, which claims the priority and benefit of U.S. Provisional Application Ser. No. 60/341,277, filed Dec. 20, 2001, entitled "METHOD AND COMPOSITION FOR COATING MAT AND ARTICLES PRODUCED THEREWITH", each of which are incorporated herein by reference.

BACKGROUND

1. Field of the Invention

The field of the invention pertains to mats, webs, or facers for the building construction industry, such as gypsum board fiberglass facers and thermosetting polyiso foam insulation board facers, as well as processes for making/applying such facers and products utilizing such facers.

2. Related Art and Other Considerations

Many forms of weather resistant webbed sheets have been developed for the building construction industry for installation as an "underlayment" under shingles or under siding. Examples of such webbed sheets, also called "construction paper", range from the old original "tar paper", up to the spun-bonded polyolefin house wraps of the present day.

Various types of webbed sheets have also been used as a "facer" material for foamed insulation board laminates, with the laminates ultimately being utilized as side-wall or roofing insulation. For example, two facers for a laminate board typically sandwich a core material therebetween, e.g., a laminated foam core, for example. A popular material ("facer") in this category is the web of U.S. Pat. No. 5,112,678 to Gay et al (referred to herein as the '678 patent). The relatively fire-resistant web of the '678 patent has also served well as an underlayment in a U.L. Incorporated fire-resistant rated roofing system over wooden decks, etc. For many years this material has served the building construction industry, e.g., as the facer for the laminated foam board product taught in U.S. Pat. No. 5,001,005. The foam board of U.S. Pat. No. 5,001,005 remains an important and integral part of both roofing and side-wall insulation.

Figure 1:
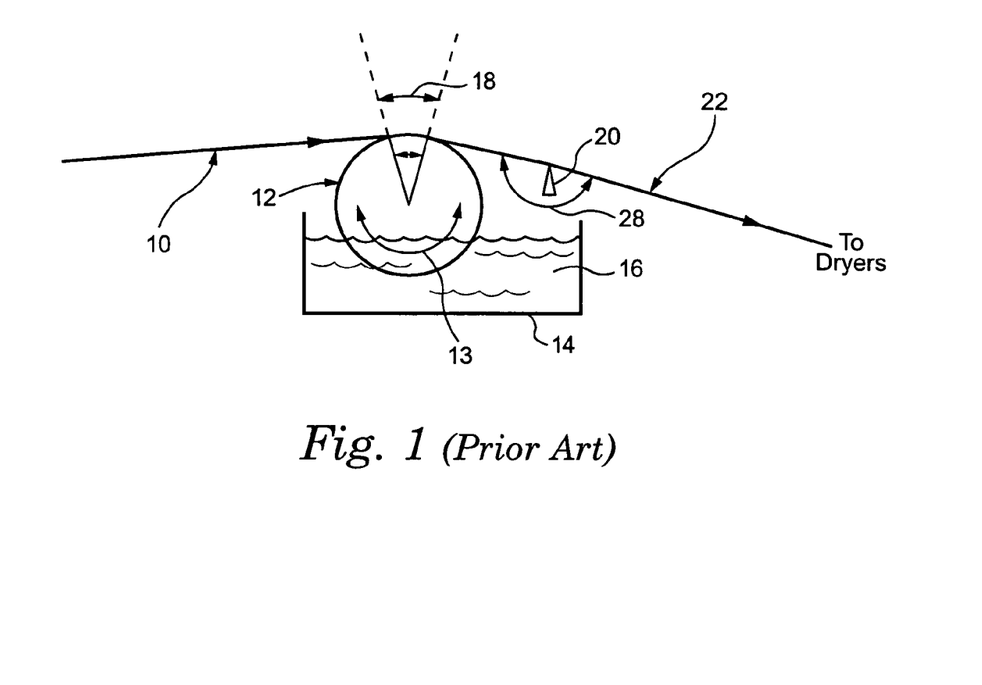
FIG. 1 is a schematic view of apparatus utilized in prior art coating process for a glass mat.

FIG. 1 shows a prior art coating method suitable for applying coatings such as those of U.S. Pat. No. 5,112,678. A raw glass mat 10 (e.g., the "substrate") enters a coating station at a level lower than a top of an applicator roll 12. The direction of travel of the glass mat 10 is parallel to a "machine direction" (M.D.) of a facer produced by the machine, while a dimension perpendicular to the machine direction and perpendicular to the plane of FIG. 1 is understood to be parallel to a "cross machine direction" (C.M.D.) of a resultant facer similarly oriented. The applicator roll is driven to rotate about its axis (either clockwise or counterclockwise, as depicted by arrow 13). A coating pan 14 is filled with a coating mix 16 up to a level that is sufficient for the applicator roll 12 to pull an adequate amount of coating to the top of the applicator roll 12. The speed of rotation of applicator roll 12 is used to get adequate amounts of coating mix 16 up into the glass mat 10 as the glass mat 10 is conveyed. In its path of conveyance, the glass mat 10 extends around applicator roll 12 in a wrap-arc 18. A scraper blade 20 is placed so that the excess coating scraped off returns into the coating pan 14. After the excess is scraped off, the coated mat proceeds into a dryer section (not shown) where the coated glass mat facer 22 is dried and wrapped into rolls.

The prior art process of FIG. 1 is characterized by a wrap arc 18 at the applicator roll 12 and a wrap angle 28 at the scraper blade 20. Conventionally, the wrap arc 18 on the applicator roll 12 is less than 30 degrees, and typically less than 20 degrees. The wrap angle 28 around the scraper bar 20 is conventionally slightly less than 180-degrees; e.g., 175-degrees.

In the construction industry, building materials are often analyzed to determine their performance vulnerabilities or weak points. A vulnerability for a laminated board made with a coated glass mat facer can be the structural integrity of the glass mat which comprises the facer. In other words, how well the glass mat of the facer holds together under stress, e.g., the cohesive strength (or lack of strength) of the glass mat, is an important indicia of material quality. Experience has generally shown that the cohesive strength of any glass mat is typically too low to resist the pulling-away force of high wind shear vacuums, whether the glass mat be incorporated either in a stucco wall or under a fully adhered single-ply membrane roofing system.

One factor influencing structural integrity of a building material which incorporates a coated glass mat is the degree to which glass fibers comprising the mat are uncovered. Uncovered glass fibers are exposed and thus more subject to deleterious forces.

The complications of using coated glass mats as ingredients in building materials such as a board are compounded when the glass mats interface with certain other materials which comprise the board core. One example of such a complicating material is Gypsum. Most gypsum board applications are more difficult, and much stronger coated glass mats are required. While the problems presented by gypsum could perhaps be solved by using heavier raw glass mat substrates, such an option is quite expensive. A challenge, therefore, is strengthening the coated glass mat (e.g., strengthening the facer) without substantially increasing costs.

The history of gypsum board development has passed many milestones, many of these milestones being related to the surfaces, or facers, covering the broad surface of a gypsum board. In almost all cases, the subject of facer stability was an issue. Also the facers have had to resist weathering as well as retaining constant dimensions. Mildew and mold have been a problem with the original multi-ply paper facers used on gypsum board. Unfortunately, the paper facers also might not allow water vapor to escape. Yet the escape of water vapor is essential in curing the gypsum. While these paper facers have been modified with chemicals to improve their properties, most of the gypsum board progress and success has come by changing from paper facers to fiberglass mat facers.

The entire scope of manufacturing different facer materials for building products is extensive, encompassing both fields of gypsum board fiberglass facers and thermosetting polyiso foam insulation board facers. In recent years, many facer-related methods and products thereof have been taught in United States patents such as the following (all of which are incorporated herein in their entirety by reference):

| | | | |
|---|---|---|---|
| 3,284,980 | 3,993,822 | 4,504,533 | 4,637,951 |
| 4,647,496 | 4,784,897 | 4,810,569 | 4,879,173 |
| 5,112,678 | 5,148,645 | 5,171,366 | 5,220,762 |
| 5,319,900 | 5,342,566 | 5,342,680 | 5,371,989 |
| 5,395,685 | 5,397,631 | 5,401,588 | 5,552,187 |

-continued

| | | | |
|---|---|---|---|
| 5,601,888 | 5,644,880 | 5,665,442 | 5,718,785 |
| 5,791,109 | 5,945,182 | 5,945,208 | 5,965,257 |
| 6,001,496 | 6,146,705 | 6,299,970 | |

As alluded to above, some coated glass mat prior art facer products are ineffective or unusable as a facer for a gypsum board. For example the coated glass mat of U.S. Pat. No. 5,965,257 shows signs of dissolving when subjected to a stream of running water, and has low tensile test numbers (e.g., when compared to the mat made from the '678 patent).

A gypsum board used in construction is much heavier than a low density, lightweight insulation foam board. The gypsum board must have enough structural strength to avoid breaking while being handled during installation. The facers of gypsum board provide most of the structural strength needed. The prior art multi-ply paper-board facers possess ample tensile strength for use as facers. However, the ordinary prior art coated glass mat facers do not have adequate tensile strength. In addition to lacking tensile strength, ordinary coated glass mat facers can face difficulty in becoming adequately bonded to the gypsum slurry.

Thus, as indicated above, conventionally a laminated board has a core which is sandwiched between two facers, the facers each comprising a coating material on a glass mat. It is the interface between the core and the glass mat where failure can occur under conditions of high stress in the "pull-apart" direction. As previously mentioned, the failure occurs because some fibers are left uncovered and the bonding strength of the so-called "binder" material between individual glass fibers is not strong enough to prevent failure. Just after a non-woven glass mat is formed on a drainage wire, a complex binder chemical is added, but this is barely strong enough to hold individual fibers together.

U.S. Pat. No. 4,647,496, U.S. Pat. No. 4,810,569, U.S. Pat. No. 5,371,989, U.S. Pat. No. 5,644,880, and U.S. Pat. No. 6,001,496, show how a glass mat can be partially imbedded in gypsum board but leave loose glass fibers on the surface.

In a gypsum board process which utilizes a coated glass mat in a facer, a fine balance must be achieved. If the coated glass mat facer has too much glass mat exposed such that the gypsum cannot cover it essentially entirely, the resultant board is unacceptable. On the other hand, if not enough glass fibers (which serve to anchor the gypsum) are left exposed, the resultant board is not acceptable. In both cases, the finished board can fail a flexural stress test, or worse, break at the job-site. Thus a coated glass mat facer must have both adequate tensile strength plus the ability to become tightly bonded and intermeshed with gypsum slurry before it hardens. Since prior art facers did not suffice, there remains a need for an unique coated glass facer to use in creating a gypsum board having a mold resistant, weather-proof surface, and strong flexural test results.

What is needed, therefore, and an object of the present invention, is a coated is glass mat which has enhanced tensile strength, as well as methods for fabricating such mat.

BRIEF SUMMARY

A coated glass mat comprises a glass mat substrate having non-woven glass fibers and a coating. The coating essentially uniformly penetrates the glass mat substrate to a desired fractional thickness of the coated glass mat. The coating imparts a tensile strength to the coated glass mat which on average is at least 1.33 times greater than the tensile strength of the glass mat substrate without the coating. On average, the weight of the coated glass mat per unit area is no more than about six times the weight of the glass mat substrate prior to coating.

In example embodiments, penetration of the coating into the glass mat substrate preferably extends to a depth of from twenty five percent of the thickness of the coated glass mat to seventy five percent of the thickness of the coated glass mat. Moreover, a non-coated thickness of the coated glass mat is sufficiently thick for bonding purposes with, e.g., a gypsum slurry or other core materials such as thermoplastic or thermosetting plastics.

The coating comprises a coating blend which provides the coated glass mat with a porosity sufficient to allow water vapor to escape from a gypsum slurry when heated. Preferably, such porosity is in a range from about 1.3 Cubic Feet per Minute (CFM) (all CFM data given are also "per square foot per") to about 5.0 CFM. The coating is preferably a coating blend comprised of water, latex binder, inorganic pigment, and inorganic binder.

The raw glass mat substrate has a weight which is between about twelve (12) pounds per thousand square feet and about fifty (50) pounds per thousand square feet. In one example, the glass mat substrate before coating weighs about fourteen and a half (14.5) pounds per thousand square feet. After coating the coated glass mat has a tensile strength which on average is greater than one hundred twenty pounds per three-inch width. In another example, the glass mat substrate before coating weighs about twenty-six and a half (26.5) pounds per thousand square feet. After coating the coated glass mat has a tensile strength which on average is greater than two hundred twenty pounds per three-inch width.

New coating methods which yield the coated glass mat expose a sufficient amount of coating to the glass mat to provide a uniform depth penetration and thereby achieve the increased tensile strength. The method facilitates a high degree of coating depth penetration (e.g., up to 75%) and yet no significant change in coating percentage composition by weight per square unit area. Because of the new coating techniques, the prior art glass mat substrate has a disproportionate increase in tensile strength relative to the increase in final product weight. The coated glass mat webs are much stronger and more weatherproof than prior art similar webs.

One of the new coating techniques involves increasing a wrap angle of the glass mat substrate around an applicator roll thereby increasing exposure of the coating to the glass mat substrate. Other techniques also provide a substantial increase in tensile strength.

DETAILED DESCRIPTION

In the following description, for purposes of explanation and not limitation, specific details are set forth such as particular compositions, techniques, etc. in order to provide a thorough understanding. However, it will be apparent to those skilled in the art that the present invention may be practiced in other embodiments that depart from these specific details. In other instances, detailed descriptions of well known substances and methods are omitted so as not to obscure the description of the present invention with unnecessary detail. It will be further understood that in the ensuing description and claims that the terms "web" and "mat" are employed interchangeably, and in the sense that the mats and webs can be used as "facers", all three terms may be utilized interchangeably.

A coated glass mat suitable for use, e.g., as a facer in a gypsum board is formed by a process which uses a substantially porous, predominately glass mat substrate. The glass mat substrate comprises non-woven glass fibers. The coating of the coated glass mat advantageously penetrates deeply into the thickness of the mat, e.g., from approximately 25% up to 75% of the mat thickness, thereby affording higher tensile strengths. To whatever depth in this range (25% up to 75% of the mat thickness) the coating extends, it does so essentially uniformly. The uniformly deep penetration is achieved by one or more new coating techniques which facilitate increased exposure of coating mixture to a glass mat substrate, thereby achieving more uniform coating penetration. Yet compared to prior art mats the coated glass mat has about the same coating percentage composition by weight per square unit area. The uncoated thickness (e.g., approximately 25% up to 75% of the thickness) of the glass mat is sufficiently thick for bonding purposes with, e.g., a gypsum slurry or other core materials such as thermoplastic or thermosetting plastics. The raw, uncoated glass mat substrate has a weight which is between about twelve (12) pounds per thousand square feet and about fifty (50) pounds per thousand square feet. An example coating batch for use in forming the coated glass mat is provided in Example 1.

The porosity of the coated glass mat is sufficiently low that it is not penetrable by gypsum slurry, yet porous enough to allow water vapor to escape from the gypsum slurry when heated, and porous enough to allow thermoplastic or thermosetting plastics, or gypsum slurry, to completely cover essentially all exposed, individual glass fibers. Preferably the porosity of the coated glass mat is in a range of from about 1.3 CFM (cubic feet per minute per square foot) to about 5.0 CFM.

The improved coating techniques thus facilitate increased exposure of the coating mixture to a glass mat substrate, and thereby a uniformly deeper penetration of the coating into the interior spaces of the glass mat. The penetration is to a depth of at least 25%, but preferably less than about 75%, of the thickness of the mat, i.e., not so far that it penetrates entirely. Such increased exposure and uniformly deep penetration is accomplished by various techniques including but not limited to those hereinafter specifically described.

Mechanical techniques for achieving the increased exposure and uniform coating penetration depth in the glass mat include the following as examples: (1) selecting a proper wrap angle for the scraper blade (in degrees of angle); and, (2) selecting a proper wrap arc on the applicator roll (in degrees). One, or the other, or both, may be employed, but it must be noted that the wrap angle at the scraper blade is dependent upon the degree of wrap-arc at the applicator roll, and vice versa. An example mode of the wrap selection technique is described below with reference to FIG. 2.

Figure 2:
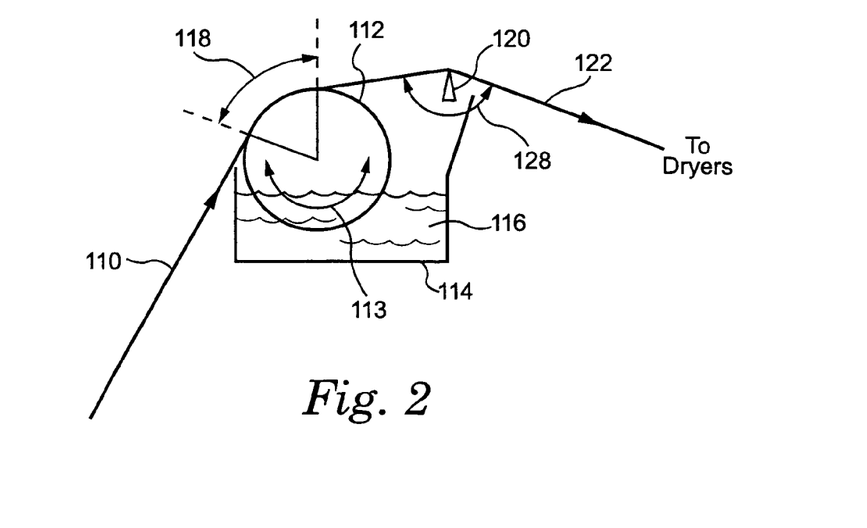
FIG. 2 is a schematic view of apparatus utilized in a coating process which achieves improved coating exposure and uniform penetration.

FIG. 2 shows basic apparatus utilized in an example mode of the improved coating process which achieves the desired increased exposure of the coating mixture to the glass mat substrate. Structural elements of the FIG. 2 apparatus which correspond to elements of the FIG. 1 apparatus have same least two significant digit reference numbers.

In contrast to the prior art process of FIG. 1, the process implemented by the FIG. 2 apparatus utilizes a higher degree of wrap-arc 118 around the applicator roll 112 and a smaller (less than 180-degrees) wrap angle 128 around scraper blade 120. This tighter wrapping method provides an increased exposure of coating mixture 116 to the glass mat substrate 110, and thereby a higher degree of uniform coating penetration into the glass mat. The degree of penetration is between approximately 25% up to 75% of the thickness into the glass mat substrate. In this coating method, the wrap-arc 118 is much larger (above about 20-degrees) than wrap-arc 18 of FIG. 1. Specifically, wrap-arc 118 is in a range from about 20 degrees to 80 degrees depending upon other operational parameters (such as, for example, speed of applicator roll 112). Likewise, wrap angle 128 of the new method is noticeably sharper than wrap angle 28 of the prior art (about 170 degrees).

It should be understood that it is the degree of exposure of the coating material 116 to the glass mat substrate 110 that is increased by the new processing techniques and which results in the more uniform penetration of the coating into the glass mat substrate. The degree of exposure or availability of the coating 116 is a different phenomena than the actual amount of acquisition by glass mat substrate 110 of the coating mixture. Indeed, using the new exposure enhancing technique, no more coating is actually applied for penetration into the glass mat substrate. Rather, there is more opportunity for uniform acquisition of the coating 116 by the glass mat substrate 110.

The coating industry has used the "1-Roll Kiss Coater" for many years. A kiss-roll applicator is normally followed by a grooved rod, but glass mat will destroy such a rod in a matter of minutes. However, a modification to the trailing blade method does work when, if an excess amount of relatively low viscosity coating mix 116 is applied to the bottom surface of the glass mat 110, the excess is scraped off with blade 120. It is believed that the combination of a kiss-roll followed by a monolithic scraper blade is a new and unique combination.

Although FIG. 2 and other drawings are not necessarily to scale, the relative dimensions have been depicted to show actual spatial relationships. They only approximately represent the path of a raw glass mat substrate as it passes through a coating station. The approximate wrap angles 118 over applicator roll 112 and 128 over the scraper blade 120 are shown to represent a definite deviation from zero wraps.

In lieu or in addition to the proper setting of wrap arc 118 and wrap angle 128, there are at least eight (8) other techniques that can be utilized to increase the degree of exposure of the coating 116 to the glass mat substrate 110. These techniques are: (1) adjusting the speed of the coating line; (2) adjusting the viscosity of the coating mix; (3) adjusting the direction of the applicator roll rotation; (4) selecting a proper diameter of the coating applicator roll; (5) adjusting the speed of the applicator roll rotation; (6) selecting a proper surface material of the applicator roll; (7) controlling the thickness of the glass mat web; and (8) controlling the porosity, in cubic feet of air per minute per square foot, of the glass mat web.

It was mentioned previously that the wrap-arc 118 is in a range of from about 20 degrees to 80 degrees. In one example, the wrap-arc 118 extends about 80 degrees and the applicator roll is rotated at a nominal angular velocity which is just slightly faster than the linear velocity of the glass mass substrate. Yet in another example, the wrap-arc 118 extends a lesser amount (e.g. 40 degrees), but the applicator roll is driven at an increased angular velocity which affords essentially the same exposure as the first example. Thus, the new techniques can be combined in order to achieve the desired exposure of the coating 116 to the glass mat substrate 110, thereby enhancing uniform coating penetration. The uniform coating penetration facilitates the improved tensile strength of the coated glass mat, e.g., a tensile strength in the machine direction which is at least 1.33 times greater than that of the glass mat substrate prior to coating.

Thus it will be understood that various mechanical ones of the techniques aforementioned can be employed to increase exposure of the coating 116 to the substrate 110 in a comparable manner. Usage of these techniques presumes, however, that the viscosity of the coating 116 is in a suitable range, and has sufficient solids content. That is, the coating 116 must be sufficiently viscous that it does not fly off the mat during the travel between applicator roll 112 and blade 120, and yet not so viscous that it cannot be picked up by applicator roll 112.

In a preferred mode, an electric motor driven, chrome plated applicator roll 112 is used. However, it is possible to use rubber or plastic coated rolls, or stainless steel rolls. The applicator roll 112 is powered to rotate in same direction as the web, and rotated slightly faster than the web. The scraper blade 120 can be made of either carbon steel, or hardened steel, or spring steel, or tungsten-carbide steel, or from various grades of ceramics. The wrap angle 128 on the blade 120 is from about 170-degrees to about 175-degrees, and the wrap arc 118 on the roll 112 is about 20-degrees to about 80-degrees, depending on other variables.

The prior art coating mixes can be utilized with the uniformly deeper penetration processing techniques herein described. For example, in one mode, filler materials containing some naturally occurring inorganic binder are deliberately chosen. These fillers with naturally occurring binders must be of a suitable mesh size. The minimum allowable quality is where at least 85% by weight of the filler passes a 200-mesh screen (Grade 85/200). Examples of such fillers having the naturally occurring binder are, but are not limited to: limestone containing quicklime (CaO), clay containing calcium silicate, sand containing calcium silicate, aluminum trihydrate containing aluminum oxide, and magnesium oxide containing either the sulfate or chloride of magnesium, or both. The filler, gypsum, can be both a mineral pigment (as gypsum dihydrate) and a binder (as gypsum hemi-hydrate), but gypsum is slightly soluble in water, and the solid form is crystalline making it a brittle and weak binder.

Various examples are now described for contrasting coated glass fabricated with prior art coating processes (see Example 1 and Example 2) with coated glass mats which utilize the increased exposure techniques herein described.

Example 1

Prior Art

For Example 1, a batch of coating mixture is made by adding 3,200 pounds of water to a mixing tank having a low speed mixer. This is followed by 80 pounds of a sodium salt of poly-naphthylmethanesulfonate dispersing agent, such as Galoryl® DT 400 N. Then is added 950 wet pounds (498.8 dry pounds) of a carboxylated SBR latex, such as Styrofan® ND5406, followed by 11,000 pounds of 85/200 (85% passes a 200-mesh screen) limestone that contains about 70 pounds of calcined lime (CaO). This produces a 15,230-pound batch of coating mixture having about 75.7% solids and with a viscosity of about 300 centipoise (cps) at 25° C. The quicklime (CaO) content is about 0.6% by weight on the total dry-weight basis. The latex solids comprise about 4.3% on the dry weight basis.

The coating mixture of Example 1, produced in accordance with U.S. Pat. No. 5,112,678, was (for Example 1) applied using the prior art process of FIG. 1 to a non-woven glass mat Dura-Glass® 7503 made by Johns Manville. The glass mat weight averaged about 13.9-lbs/MSF (thousand square feet), and had a thickness average of about 0.023-inches. The final coated product weight averaged about 84.8-lbs/MSF, indicating that the coating solids added 70.9-lbs/MSF.

Figure 3A:
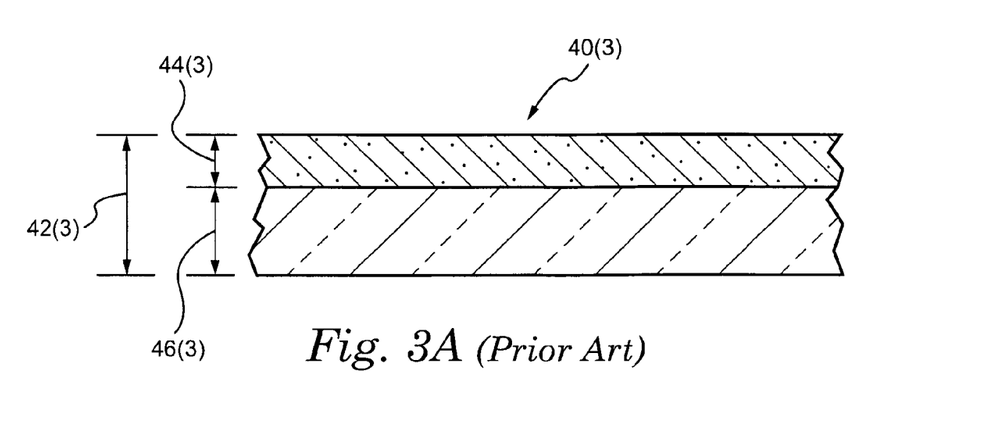
FIG. 3A is a schematic cross-sectional view of a section of a side view of a coated glass mat fabricated in accordance with Example 1.

FIG. 3A depicts a section of a side view of a coated glass mat 40(3) made fabricated in accordance with Example 1. The coated glass mat of FIG. 3A is made from the 14.5-lbs/MSF raw glass mat substrate (Dura-Glass® 7503), with a final coated product weight averaging about 85.0-lbs/MSF (indicating that the coating solids added 70.5-lbs/MSF). For the coated glass mat of FIG. 3A, the thickness dimension (represented by reference numeral 42(3)) is about 0.026-inches. The measured thickness of the coating penetration is depicted by arrow 44(3), while the thickness of the portion remaining uncoated is labeled by arrow 46(3).

Figure 3B:
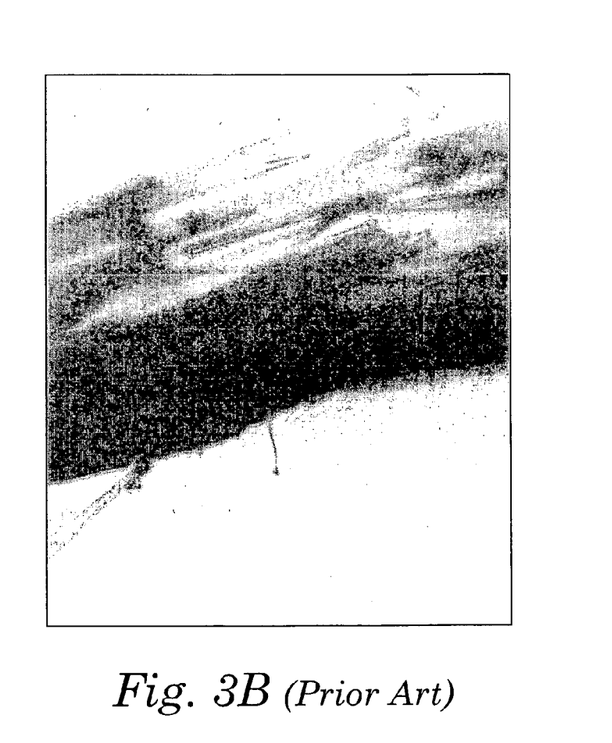
FIG. 3B is a photomicrograph of a coated glass mat fabricated according to Example 1.

By the use of common laboratory microscope, it was discovered that of the total finished mat thickness of FIG. 3A, the coating material penetrates from about 10% up to about 25%. Said another way, the ratio of coating penetration thickness 44(3) to non-coated thickness 46(3) is about 25 to 75. The portion having the uncoated glass fibers is employed in holding the core material (e.g., polyiso foam), making a reasonably strong laminated panel as taught by U.S. Pat. No. 5,001,005. A photomicrograph of a coated glass mat according to Example 1 is shown in FIG. 3B.

Table 1 shows thirty (30) samples of tensile test data generated for the coating and prior art processing techniques of Example 1, as well as average tensile test data, a standard deviation, and a range. For each sample, tensile test data for the resultant coated glass mat is supplied in column 1 with respect to the machine direction (M.D.), and in column 2 with respect to the cross-machine direction (C.M.D.) dimension of the glass mat. All tensile strength values provided herein (including those listed in Table 1 and other tables) are in units of pounds per three inch wide strip of coated glass mat.

Prior to coating, the glass mat substrate of Example 1 had an average nominal tensile strength in the machine direction of 90 pounds per three inch width and an average tensile strength in the cross machine direction of 60 pounds per three inch width. From Table 1 it can be seen that the coating imparts a tensile strength to the coated glass mat which, on average, is less than 1.10 times greater in the machine direction than the tensile strength of the glass mat substrate in the machine direction prior to coating.

TABLE 1

| Sample # | Example 1 M.D. | Example 1 C.M.D. |
|---|---|---|
| 1 | 116 | 97 |
| 2 | 118 | 99 |

TABLE 1-continued

| Sample # | Example 1 M.D. | Example 1 C.M.D. |
|---|---|---|
| 3 | 88 | 74 |
| 4 | 87 | 68 |
| 5 | 89 | 61 |
| 6 | 86 | 72 |
| 7 | 96 | 88 |
| 8 | 87 | 80 |
| 9 | 112 | 88 |
| 10 | 118 | 91 |
| 11 | 95 | 71 |
| 12 | 99 | 82 |
| 13 | 97 | 78 |
| 14 | 87 | 68 |
| 15 | 90 | 75 |
| 16 | 84 | 64 |
| 17 | 96 | 72 |
| 18 | 76 | 66 |
| 19 | 88 | 66 |
| 20 | 86 | 77 |
| 21 | 95 | 80 |
| 22 | 90 | 76 |
| 23 | 116 | 99 |
| 24 | 100 | 98 |
| 25 | 102 | 82 |
| 26 | 114 | 78 |
| 27 | 116 | 99 |
| 28 | 114 | 98 |
| 29 | 112 | 98 |
| 30 | 110 | 94 |
| Average | 98.8 | 81.3 |
| Std. Dev. | 12.6 | 12.2 |
| Range | 42.0 | 38.0 |

Example 2

Prior Art

As Example 2, a coated glass mat facer fabricated by Elk Corporation in accordance with the prior art process of U.S. Pat. No. 5,965,257 and known as "ISO FACER 1" was evaluated. The coated glass mat facer of Example 2 weighed about 99-lbs/MSF, and measured (with a caliper) a thickness of about 0.034-inches. Thirty samples of tensile test data for the mat of Example 2 are shown in Table 2, the first column of Table 2 showing tensile test data with respect to the machine direction (M.D.) and the second column showing tensile test data with respect to the cross-machine direction (C.M.D.).

Comparison of the tensile strengths for Example 1 and Example 2 as set forth in Table 1 and Table 2, respectively, show that even with more thickness and higher weight, the product of Example 2 is considerably weaker than the product made as Example 1. Yet both Example 1 and Example 2 pale in contrast to the substantially higher tensile strengths achieved by the remaining Examples, the higher tensile strength being advantageously achieved without increases in weight or thickness.

TABLE 2

| Sample # | Example 2 M.D. | Example 2 C.M.D. |
|---|---|---|
| 1 | 89 | 54 |
| 2 | 93 | 70 |
| 3 | 83 | 63 |
| 4 | 88 | 58 |
| 5 | 83 | 59 |
| 6 | 92 | 62 |

TABLE 2-continued

| Sample # | Example 2 M.D. | Example 2 C.M.D. |
|---|---|---|
| 7 | 87 | 55 |
| 8 | 77 | 65 |
| 9 | 106 | 70 |
| 10 | 98 | 62 |
| 11 | 78 | 59 |
| 12 | 69 | 55 |
| 13 | 75 | 58 |
| 14 | 79 | 60 |
| 15 | 107 | 82 |
| 16 | 100 | 78 |
| 17 | 73 | 51 |
| 18 | 72 | 54 |
| 19 | 74 | 62 |
| 20 | 71 | 68 |
| 21 | 61 | 47 |
| 22 | 68 | 54 |
| 23 | 72 | 56 |
| 24 | 68 | 38 |
| 25 | 69 | 57 |
| 26 | 89 | 75 |
| 27 | 74 | 40 |
| 28 | 91 | 79 |
| 29 | 72 | 40 |
| 30 | 79 | 46 |
| Average | 81.2 | 59.2 |
| Std. Dev. | 11.9 | 11.2 |
| Range | 46.0 | 44.0 |

Concerning the data of Table 1 and Table 2, the sample size tested was 3-inches wide by 10-inches long, with 1-inch at each end inside the jaws, and the tensile test jaws were pulled at the speed of 1-inch per minute. Those familiar with test results of uncoated glass mat will note that the Standard Deviation is very similar to the tensile test Sigma of plain glass mat. In other words, the wide range of test scores for tensile testing are built into the glass mat as produced, and coating the mat has no effect on that wide range other than raise the individual numbers.

Example 3

Example 3 utilized the same coating batch mixture as Example 1. The coating of Example 3 was applied to a glass mat using the process of FIG. 2. The glass mat weighed 14.5-pounds per MSF (thousand square feet).

Table 3 shows samples of tensile strength data for Example 3. As with the Table 4 mats discussed subsequently, for the Table 3 mats the sample size tested was 3-inches wide by 10-inches long, with 1-inch at each end inside the jaws, and the tensile test jaws were pulled at the speed of 1-inch per minute. The coated glass mats of Example 3 had an average thickness of 0.026-inches and weighed an average of 85-lbs per 1,000-square feet (MSF). Of that finished weight, about 70.5-lbs/MSF was coating and 14.5-lbs/MSF was glass mat.

TABLE 3

| Sample # | Machine Direction | Cross Mach. Dir. |
|---|---|---|
| 1 | 101.6-lbs/3-inch | 114.1-lbs/3-inch |
| 2 | 113.5-lbs/3-inch | 111.8-lbs/3-inch |
| 3 | 140.2-lbs/3-inch | 113.1-lbs/3-inch |
| 4 | 116.9-lbs/3-inch | 102.9-lbs/3-inch |
| 5 | 120.5-lbs/3-inch | 95.5-lbs/3-inch |
| 6 | 110.9-lbs/3-inch | 119.7-lbs/3-inch |
| 7 | 111.5-lbs/3-inch | 108.0-lbs/3-inch |
| 8 | 129.3-lbs/3-inch | 126.7-lbs/3-inch |
| 9 | 159.8-lbs/3-inch | 108.0-lbs/3-inch |

TABLE 3-continued

| Sample # | Machine Direction | Cross Mach. Dir. |
|---|---|---|
| 10 | 141.8-lbs/3-inch | 127.9-lbs/3-inch |
| 11 | 135.5-lbs/3-inch | 140.8-lbs/3-inch |
| 12 | 130.5-lbs/3-inch | 144.0-lbs/3-inch |
| 13 | 83.5-lbs/3-inch | 96.0-lbs/3-inch |
| 14 | 113.8-lbs/3-inch | 106.0-lbs/3-inch |
| 15 | 112.5-lbs/3-inch | 114.9-lbs/3-inch |
| 16 | 134.5-lbs/3-inch | 105.8-lbs/3-inch |
| 17 | 126.8-lbs/3-inch | 84.6-lbs/3-inch |
| 18 | 141.7-lbs/3-inch | 123.3-lbs/3-inch |
| Average | 123.6-lbs/3-inch | 113.5-lbs/3-inch |
| Std. Dev. | 17.8 | 15.3 |

Prior to coating, the glass mat substrate of Example 3 had an average nominal tensile strength in the machine direction of 90 pounds per three inch width and an average tensile strength in the cross machine direction of 60 pounds per three inch width. From Table 3 it can be seen that the coating imparts a tensile strength to the coated glass mat which, on average, is at least 1.33 times greater in the machine direction than the tensile strength of the glass mat substrate in the machine direction prior to coating. In particular, for Example 3 the coating imparts a tensile strength to the coated glass mat which is, on average, 1.37 times greater than the tensile strength of the glass mat substrate prior to coating. When the term "tensile strength" is utilized herein without reference to direction, it is understood to refer to tensile strength in a machine direction.

The constituency of the coating and degree of application of the coating for Example 3 is such that, on average, the weight of the coated glass mat per unit area after coating is no more than six times the weight of the glass mat substrate before coating. That is, the coating weight is less than five (5) times the weight of the glass mat substrate (prior to coating). The average porosity for the coated glass mat of Example 3 is between 3.8 CFM and 3.9 CFM.

Example 4

The coating batch for Example 4 was the same as for Example 1, but was applied using the process of FIG. 2 to a glass mat (Dura-Glass 7503) sold as weighing 14.5-pounds per MSF (thousand square feet), but actually weighing 14.9-pounds per MSF. The coated glass mat weighed 89.1-pounds per MSF on average. As with the Example 1 mats, the Example 4 mat sample size tested was 3-inches wide by 10-inches long, with 1-inch at each end inside the jaws, and the tensile test jaws were pulled at the speed of 1-inch per minute. Approximately the same coating weight was applied (an average of 74.2-pounds/MSF), but the improved processing techniques made the coating penetrate more uniformly and further into the glass mat substrate. In doing this, the approximate same coating weight created a final product with substantially higher tensile strength, as indicated by Table 4.

TABLE 4

| | Example 4 Tensile Data | |
|---|---|---|
| Sample # | M.D. | C.M.D. |
| 1 | 122 | 110 |
| 2 | 114 | 108 |
| 3 | 141 | 113 |
| 4 | 117 | 103 |

TABLE 4-continued

| | Example 4 Tensile Data | |
|---|---|---|
| Sample # | M.D. | C.M.D. |
| 5 | 121 | 96 |
| 6 | 123 | 120 |
| 7 | 112 | 108 |
| 8 | 129 | 125 |
| 9 | 150 | 108 |
| 10 | 141 | 127 |
| 11 | 135 | 120 |
| 12 | 130 | 138 |
| 13 | 130 | 121 |
| 14 | 134 | 101 |
| 15 | 128 | 114 |
| 16 | 134 | 105 |
| 17 | 126 | 97 |
| 18 | 141 | 98 |
| 19 | 121 | 100 |
| 20 | 143 | 128 |
| 21 | 140 | 98 |
| 22 | 110 | 98 |
| 23 | 121 | 109 |
| 24 | 146 | 105 |
| 25 | 148 | 110 |
| 26 | 138 | 106 |
| 27 | 135 | 97 |
| 28 | 141 | 104 |
| 29 | 138 | 102 |
| 30 | 143 | 104 |
| Average | 131.7 | 109.1 |
| Std. Dev. | 11.1 | 10.8 |
| Range | 40.0 | 42.0 |

Figure 4A:
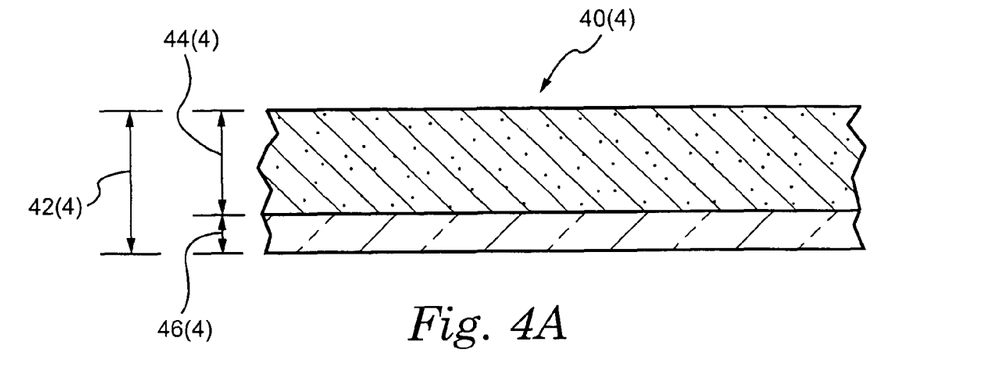
FIG. 4A is a schematic cross-sectional view of a section of a side view of a coated glass mat fabricated in accordance with Example 4.
Figure 4B:
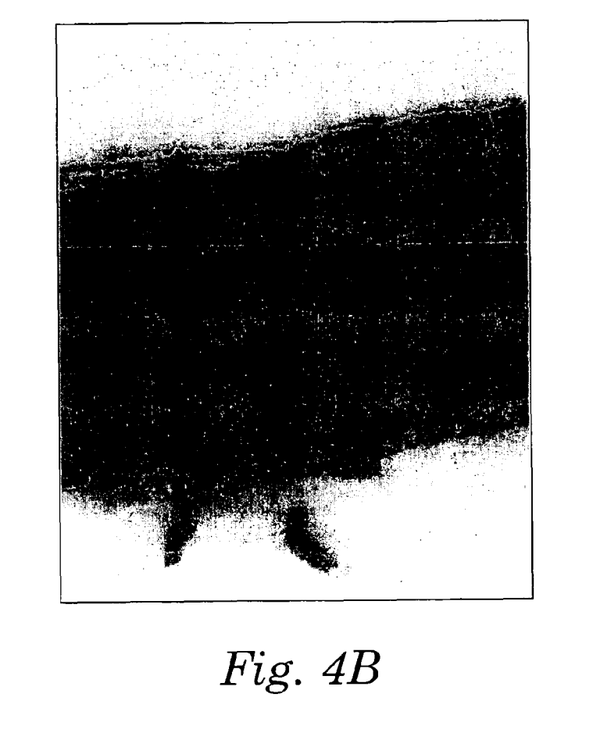
FIG. 4B is a photomicrograph of a coated glass mat fabricated according to Example 4.

FIG. 4A depicts a cross section of a coated glass mat 40(4) fabricated in accordance with Example 4. The thickness dimension (represented by reference numeral 42(4)) of coated glass mat 40(4) is about 0.026-inches. The measured thickness of the coating penetration is depicted by arrow 44(4), while the thickness of the portion remaining uncoated is labeled by arrow 46(4). By the use of a common laboratory microscope, it was discovered that of the total finished mat 40(4) thickness (0.026 inches), the coating material penetrates about 70% (seventy percent), or about 0.014-inches. Said another way, the ratio of 44(4) to 46(4) is about 70-to-30. The portion of uncoated glass fibers that successfully hold gypsum slurry and other core materials such as thermoplastic and thermosetting plastics. FIG. 4B is a photomicrograph of a coated glass mat fabricated according to Example 4.

Prior to coating, the glass mat substrate of Example 4 had an average nominal tensile strength in the machine direction of 90 pounds per three inch width and an average tensile strength in the cross machine direction of 60 pounds per three inch width. From Table 4 it can be seen that the coating imparts a tensile strength to the coated glass mat which, on average, is at least 1.33 times greater in the machine direction than the tensile strength of the glass mat substrate in the machine direction prior to coating. In particular, for Example 4 the coating imparts a tensile strength to the coated glass mat which is, on average, 1.46 times greater than the tensile strength of the glass mat substrate prior to coating.

The constituency of the coating and degree of application of the coating for Example 4 is such that, on average, the weight of the coated glass mat per unit area after coating is no more than about six times the weight of the glass mat substrate before coating. That is, the coating weight is less than five (5) times the weight of the glass mat substrate (prior to coating). The average porosity for the coated glass mat of Example 4 is between 1.5 CFM and 1.6 CFM.

The tensile strengths of the glass mat facers of Example 4 which have the deeper coating penetration are 62.2% better in the machine direction (M.D.), and 84.3% better in the cross machine direction (C.M.D.) than the glass mat facers of Example 2; and, 33.3% better in the machine direction (M.D.), and 34.2% better in the cross machine direction (C.M.D.) than the glass mat facers of Example 1.

Example 5

The coating batch for Example 5, like that of Example 4, was the same as for Example 1, but was applied using the process of FIG. 2 to a glass mat (Dura-Glass 7503) weighing 26.5-pounds per MSF (thousand square feet). The Example 5 mat sample size tested was 3-inches wide by 10-inches long, with 1-inch at each end inside the jaws, and the tensile test jaws were pulled at the speed of 1-inch per minute. The tensile strength for the mats of Example 5 are shown in Table 5.

Figure 5A:
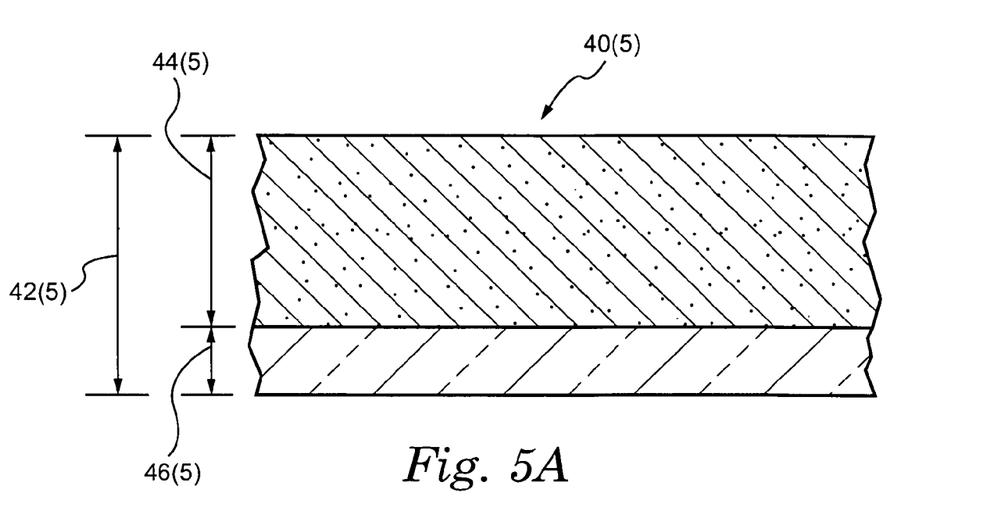
FIG. 5A is a schematic cross-sectional view of a section of a side view of a coated glass mat fabricated in accordance with Example 5.
Figure 5B:
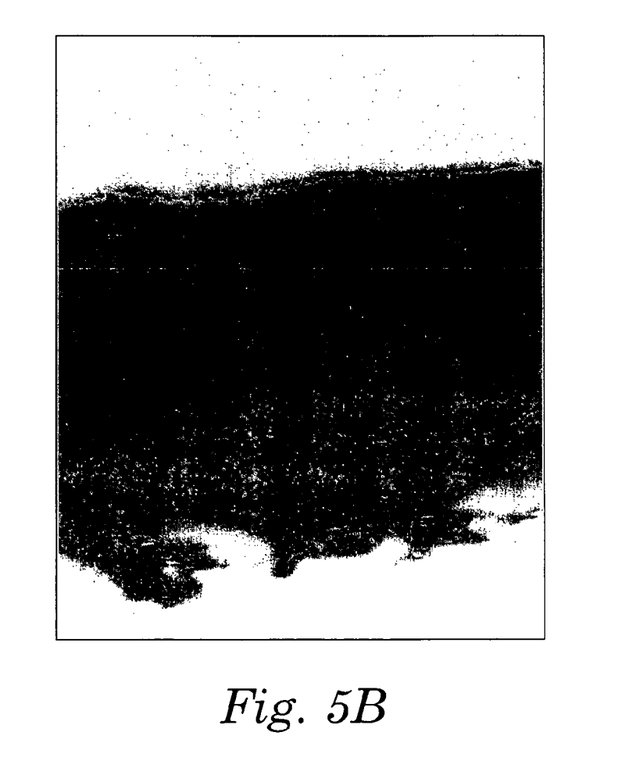
FIG. 5B is a photomicrograph of a coated glass mat fabricated according to Example 5.

FIG. 5A is a side cross-sectional view of a coated glass mat 40(5) fabricated in accordance with Example 5. Example 5 utilized a heavier and stronger glass mat substrate weighing 26.5-pounds per MSF (thousand square feet). In FIG. 5A, the total thickness dimension depicted by arrow 42(5) is about 0.036-inches thick. In the Example 5 coated mat 40(5), the coating permeates into the glass mat to a depth depicted by arrow 44(5), leaving an uncoated portion of thickness indicated by arrow 46(5). The thickness (depicted by arrow 42(5)) of the total finished coated mat 40(5) is on the order of 0.036-inches. Microscopic analysis shows that the coating material penetrates to about 75% (seventy-five percent), or 0.027-inches. Thus the ratio of coated thickness to uncoated thickness is about 75-to-25. Although the coated mat 40 of Example 5 comprises a lower total weight of coating, the coating penetrates to a greater thickness, thereby covering more glass fibers. Therefore, the coating is less dense. FIG. 5B is a photomicrograph of a coated glass mat fabricated according to Example 5.

The weight of this finished product of Example 5 was 87.5-lbs/MSF, surprisingly only 3.2% heavier than the prior art coated mat using 14.5-lbs/MSF glass mat substrate. The Example 5/Table 5 coated glass mat is comprised of 26.5-lbs/MSF of uncoated glass mat (substrate) plus only 61.0-lbs/MSF coating. The amount of the coating added was lower than for the coated mats of Table 1 and Table 2 (e.g., the coated mats which used the 14.5-lbs/MSF mat) The lighter mat consistently picked up over 70.0-bls/MSF, whereas the 26.5-lbs/MSF mat picked up only 61.0-lbs/MSF.

TABLE 5

| Sample # | Machine Direction | Cross Mach. Dir. |
| --- | --- | --- |
| 1 | 226.8-lbs/3-inch | 214.0-lbs/3-inch |
| 2 | 227.5-lbs/3-inch | 184.4-lbs/3-inch |
| 3 | 274.8-lbs/3-inch | 167.5-lbs/3-inch |
| 4 | 229.1-lbs/3-inch | 168.4-lbs/3-inch |
| 5 | 305.1-lbs/3-inch | 176.1-lbs/3-inch |
| 6 | 275.0-lbs/3-inch | 174.2-lbs/3-inch |
| 7 | 312.5-lbs/3-inch | 176.1-lbs/3-inch |
| 8 | 261.5-lbs/3-inch | 267.5-lbs/3-inch |
| 9 | 294.8-lbs/3-inch | 256.5-lbs/3-inch |
| 10 | 299.6-lbs/3-inch | 210.9-lbs/3-inch |
| Average | 270.7-lbs/3-inch | 199.6-lbs/3-inch |
| Std. Dev. | 33.3 | 36.8 |

Prior to coating, the glass mat substrate of Example 5 had an average nominal tensile strength in the machine direction of 90 pounds per three inch width and an average tensile strength in the cross machine direction of 80 pounds per three inch width. From Table 5 it can be seen that the coating imparts a tensile strength to the coated glass mat which, on average, is at least 1.33 times greater in the machine direction than the tensile strength of the glass mat substrate in the machine direction prior to coating. In particular, for Example 5 the coating imparts a tensile strength to the coated glass mat which is, on average, 3.00 times greater than the tensile strength of the glass mat substrate prior to coating.

The constituency of the coating and degree of application of the coating for Example 5 is such that, on average, the weight of the coated glass mat per unit area after coating is no more than six times the weight of the glass mat substrate before coating. In particular, for Example 5 the weight of the coated glass mat per unit area after coating is only about 3.3 times the weight of the glass mat substrate before coating. That is, the coating weight is less than five (5) times the weight of the glass mat substrate (prior to coating).

So with a very small increase in total product weight (3.2% increase), the tensile strength in the machine direction was improved 274% (270.7/98.8×100), and in the cross-machine direction by 246% (199.6/81.3×100). This average increase of about 260% in overall tensile was better than expected.

The weights of the particular glass mat substrates described in conjunction with the tensile strength enhancement examples hereof are just examples. It should be understood that any glass mat weighing more than 12.0-pounds per MSF, but preferably between 14.0-pounds per MSF and 30.0-pounds per MSF, may be used with the new techniques herein disclosed. Inappropriate (e.g., lighter weight) glass mats do not achieve the unusually high tensile strengths that are obtained by adding less coating to heavier glass mats. Appropriate weight glass mats are obtained from Saint-Gobain Vetrotex America, Inc. and Johns Manville.

In view of the fact that the coated glass mats described herein have more uniform penetration of coating into the glass mat, the coating binds far more glass fibers together than the coating of the prior art coated glass mat. The latex binder of the coating is apparently better utilized, thus providing much higher tensile strengths. More importantly, the coating binder spreads out more uniformly to fill more glass fiber interstices, thereby enhancing the strength.

The coated glass mat is advantageously employed in a laminate product. By eliminating uncovered glass fibers in a laminate product, essentially all of the coating meets up against the core (e.g., Gypsum or polyiso foam insulation sandwiched between the two coated glass mat facers). With essentially all of the glass fibers having a contiguous covering of either coating or core material, the cohesive strength of ordinary glass mats becomes a mute point. The bonding strength between core material and the coating is known to be good. The increased exposure of coating mix to the glass mat substrates thus affords sufficient volume of non-coated glass fibers to form an excellent bond with the gypsum slurry. The substantial improvement in coated glass mat tensile strength plus the excellent bond to the cured gypsum board creates a high flexural test result, well above the minimum requirement of the gypsum board product. The greater thickness of uncoated glass mat proved to be detrimental in attempts to impregnate the additional thickness with polyiso foam, for example.

The heavier weight glass mat was expected to pick up correspondingly more coating weight. Manufacturing engineers had anticipated a need to run the coaters substantially slower. However, the heavier glass mat picked up a lower mass of coating instead of a higher mass. It was discovered that while the coater did need to run slower to accomplish complete dryness, the speed reduction was not the magnitude expected.

Another benefit discovered when utilizing the lower density (less coating mass covering more glass mat volume) coating was that when used as a facer for gypsum its porosity was perfect. This means it was dense enough to prevent gypsum slurry from penetrating, yet not too dense to causes the facer to blow off from escaping steam.

The enhanced tensile strength coated glass mat advantageously has the ability to intertwine with a gypsum slurry and to combine to produce a high flexural strength in a three-dimensional board, made of gypsum or other core materials such as thermoplastic or thermosetting plastics. The coated glass mat or web also has good weather-proof characteristics, while at the same time having excellent mold-growth resistance.

The enhanced tensile strength coated glass mat has enough porosity to allow the gypsum to "breathe-out" water vapor while still processing yet not allow gypsum slurry to leak through into the processing machinery.

Thus, an improvement that was anticipated to be much more costly and generally onerous to manufacture turned out to be only slightly more costly and no more difficult to produce.

Further, the enhanced tensile strength coated glass mat has enough fibers available to bond well with the cured gypsum, without leaving too much glass fiber thickness such that the wet gypsum slurry does not penetrate enough to cover all the loose fibers.

While providing the above mentioned desirable properties, the coated glass mat/facer remains a low-cost product due, e.g., to its using economy grade limestone in rich abundance and very little of the high-cost polymer latexes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The embodiments of the invention in which an exclusive property or privilege is claimed are defined as follows:

1. A coated glass mat comprising:
   a glass mat substrate having non-woven glass fibers; and
   a coating comprising latex binder and inorganic pigment,
   said coating being present in an amount of about 61 lbs/MSF to about 75 lbs/MSF and being only partially permeated into said substrate while also imparting a tensile strength to the coated glass mat which on average is at least 1.33 times greater than the tensile strength of the glass mat substrate without the coating, wherein the coating comprises a coating blend which provides the coated glass mat with a porosity sufficient to allow water vapor to escape from a gypsum slurry when heated.

2. The coated glass mat of claim 1, wherein the coating further comprises an inorganic binder.

3. The coated glass mat of claim 1, wherein said non-woven glass mat weighs between about twelve pounds per thousand square feet and about fifty pounds per thousand square feet.

4. The coated glass mat of claim 1, wherein the glass mat substrate before coating weighs about fourteen and a half (14.5) pounds per thousand square feet and wherein after coating the coated glass mat has a tensile strength which on average is greater than one hundred twenty pounds per three-inch width.

5. The coated glass mat of claim 1, wherein the glass mat substrate before coating weighs about twenty-six and a half (26.5) pounds per thousand square feet and wherein after coating the coated glass mat has a tensile strength which on average is greater than two hundred twenty pounds per three-inch width.

6. The coated glass mat of claim 1, wherein penetration of the coating into the glass mat substrate extends a depth of from twenty five percent of a thickness of the coated glass mat to seventy five percent of the thickness of the coated glass mat.

7. The coated glass mat of claim 1, wherein the coating uniformly penetrates the glass mat substrate to a desired fractional thickness of the coated glass mat.

* * * * *